July 2, 1974  KEN KOIZUMI ET AL  3,822,120
PROCESS FOR PRODUCING LIGHT-CONDUCTING GLASS FIBER BY
CORE AND OUTER LAYER EXCHANGE
Filed Dec. 24, 1970
FIG. 1
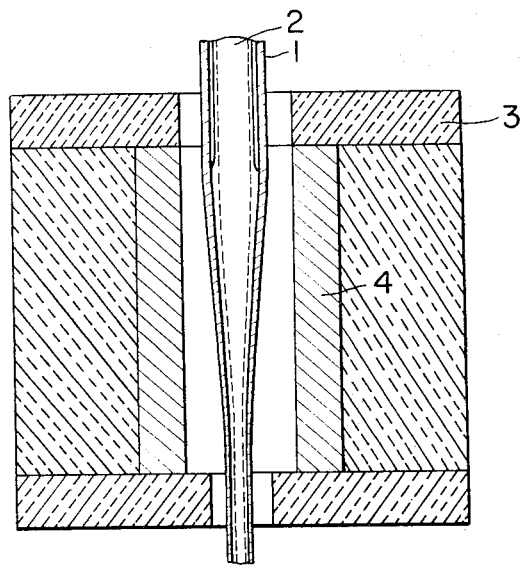
FIG. 2(a)     FIG. 2(b)     FIG. 2(c)
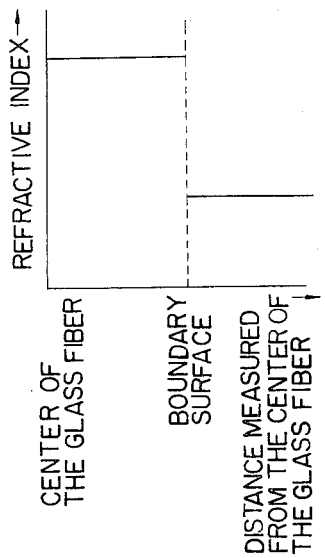 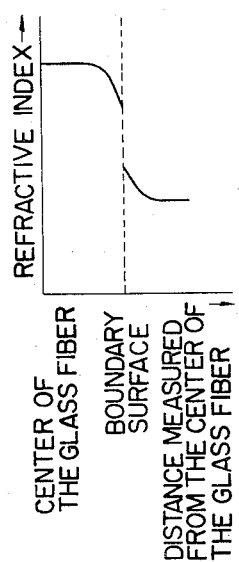 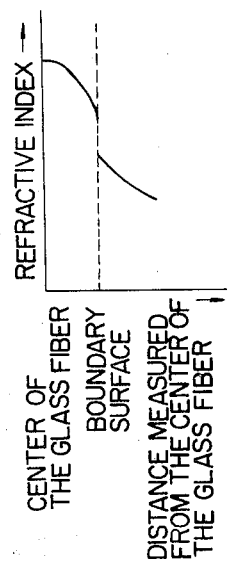

United States Patent Office 3,822,120
Patented July 2, 1974

3,822,120
PROCESS FOR PRODUCING LIGHT-CONDUCTING GLASS FIBER BY CORE AND OUTER LAYER EXCHANGE
Ken Koizumi, Kawanishi, and Mitsugi Yoshiyagawa, Takarazuka, Japan, assignors to Nippon Selfoc Kabushiki Kaisha, (also known as Nippon Selfoc Co., Ltd.), Tokyo-to, Japan
Filed Dec. 24, 1970, Ser. No. 101,290
Claims priority, application Japan, Dec. 30, 1969, 45/423
Int. Cl. C03c 15/00, 25/02
U.S. Cl. 65—3                9 Claims

ABSTRACT OF THE DISCLOSURE

In a process for producing a light-conducting glass fiber wherein a glass fiber comprising a core glass containing ions greatly contributable to the refractive index and an outer coating glass layer including ions less contributable to the refractive index is maintained at a high temperature so that thermal mutual diffusions of these ions are caused through the boundary surface between the core glass and the outer coating glass layer, whereby a glass fiber having a distribution of the refractive index, in a plane perpendicular to the optical axis thereof wherein the index progressively decreases from a value at the center of the glass fiber, is obtained, the viscosity of the coating glass layer is selected to be higher than the viscosity of the core glass at a high temperature, or a separate coating material having a higher viscosity than that of the core glass is further applied over the glass fiber before the glass fiber is subjected to the high temperature, whereby the temperature for the thermal diffusion can be further elevated, and the mutual diffusions of ions are much accelerated without causing deformation of the glass fiber.

BACKGROUND OF THE INVENTION

This invention relates generally to light-conducting glass structures, and more particularly to a method for producing a light-conducting glass structure wherein the distribution of the refractive index in a cross-sectional plane perpendicular to the optical axis of the structure is such that the index gradually varies.

Recently, intense studies have been carried out on light communication techniques employing laser light, and various types of light-conducting paths to be employed for the light communication have been proposed. Among those proposals, a method for producing a glass fiber or bar (hereinafter called a focusing light-conducting fiber) is disclosed in the preprint S5-5 for Denshi Tsushin Gakkai Zenkoku Taikai (the national convention of the Japan Electronic Communication Society) in 1969, on page 70. It is made clear in this disclosure that it is possible to provide a light-conductive structure whose distribution of refractive index in a cross sectional plane perpendicular to the optical axis (central axis) of the structure is such that the index decreased in proportion to the second power of distance measured from the central axis, and also that the method is advantageous because it provides glass fibers which are affected to only a slight degree by influences from the outer atmosphere, and which can be bent freely and flexibly whenever necessary.

The method for producing these light-conducting fibers is also disclosed in U.S. Pat. Application No. 806,368, filed on Mar. 12, 1969, in accordance with which, ion exchanges are caused to occur between the glass and a melted salt bath or mutual diffusion of cations is caused to take place between two kinds of glasses having different compositions so that a desired distribution of concentration of modifying oxides is established by thermal mutual diffusion of cations.

It is well known that, when a glass fiber having a central core portion and a coating layer overlaid thereon, both having different compositions, is maintained at a high temperature, mutual diffusion of ions take place through the boundary surface or interface. However, if it is desired that the mutual diffusion of ions be attained to such an extent that a distribution of the refractive index sufficient to obtain a desired light conductivity is acquired, it is desirable that ions having a considerably larger electronic polarization coefficient per unit volume and having a higher degree of contribution to the refractive index, such as thallium ions, be included in the core portion of the glass fiber, while ions having a considerably smaller electronic polarization coefficient and hence a lower degree of contribution to the refractive index, and consisting of, for instance at least one kind selected from Li, Na, K, Rb, and Cs ions be included in the outer coating layer of the glass fiber so that mutual diffusion of these ions are realized therebetween.

This principle is also disclosed in detail in U.S. Pat. Application No. 803,368, filed on Mar. 12, 1969. That is, when the treating conditions of the heat treatment are suitably selected, the distribution of refractive index near the optical axis of the fiber glass, along a transverse plane thereof, can be expressed by a parabolic equation $n = n_0(1 - ar^2)$, wherein $n_0$ is the refractive index at the center (optical axis) of the plane, $r$ is distance from the center, $n$ is the refractive index at distance $r$, and $a$ is a positive constant.

A fiber glass having the above described distribution of refractive index has high practical utility as a transmission path for laser communication and as a novel lens-action body for optical or information processing purposes.

In the cross sectional transverse plane of said glass fiber, the concentration of ions having high degree of the contribution to refractive index, for example, the concentration of thallium ion, gradually decreases from the central portion toward the periphery and a concentration of ions having lower degree of contribution to the refractive index, for example, the concentration of alkaline metal ions, increases from the central portion toward the periphery and both of said ions form said distribution of refractive index.

SUMMARY OF THE INVENTION

A primary object of the present invention is to provide an improved process for producing focusing light conducting glass fibers wherein a relatively higher temperature range is employed for the mutual diffusion of cations, and the required period for its diffusion is considerably shortened.

According to the present invention, in a first aspect thereof, the above stated object of the invention can be achieved by selecting the material constituting the coating layer over the core glass so that the viscosity of the material in a higher temperature range is far higher than that of the core glass. By the employment of such a material of high viscosity at a high temperature, deformation of the glass fiber due to the high temperature can be prevented, and the above described thermal diffusion of cations can be promoted.

According to the present invention, in a second aspect thereof, the above described object of the invention can be achieved by the application of still another coating material, having a higher viscosity at a high temperature, over the previously described coating layer of the glass fiber, whereby the deformation of the glass fiber due to softening by the high temperature can be prevented, and the mutual diffusion of cations can be accelerated.

The nature, principle, and utility of the present invention will be more clearly understood from the following detailed description of the invention when read together with the accompanying drawing.

BRIEF DESCRIPTION OF DRAWING

In the drawing:

FIG. 1 is a longitudinal sectional view indicating a process for producing the light-conducting glass fiber according to the present invention; and FIGS. 2(a), 2(b), and 2(c) are graphical representations indicating distributions of refractive indices in glasses established sequentially in the process according to the present invention for producing a light-conducting glass fiber as indicated in FIG. 1.

DETAILED DESCRIPTION

A glass fiber or glass bar according to the present invention, before it is subjected to a heat-treatment, comprises two kinds of glasses as classified by composition. One of the two kinds of glasses employed for the core portion of the glass fiber having a circular or nearly circular cross-sectional configuration contains ions having a higher degree of contribution to the refractive index, such as thallium ions, while the other kind of glass employed for the coating layer around the core portion of the glass fiber contains ions of lower degree of contribution to the refractive index in comparison with the first mentioned ions and, for instance, comprising at least one kind of alkali metal, such as Li, Na, K, Pb, and Cs. The boundary surfaces of the core portion and the coating layer of the glass fiber are completely fused together.

Furthermore, the core portion of the glass fiber or bar may also comprise a plurality of fibers assembled in a bundle, in which case, the glass constituting the coating layer infiltrates into the gaps between the plurality of bundled fibers and fuses them together.

In the first aspect of the invention, the ratio of the viscosities of glasses constituting the core portion and the coating layer is preferably of an order such that the viscosity of the latter glass is four times and preferably ten times as large as that of the former glass at their heat-treatment temperature. Likewise, in the second aspect of the invention, where a third material is coated on the surface of the glass fiber having the above described two portions, it is preferable that the viscosity of the third material be four times and preferably ten times as large as that of the glass fiber at its heat-treating temperature.

The above mentioned difference of viscosities is required for supporting the core portion of the glass fiber by means of the coating layer in the first aspect of the invention or of the third material in the case of the second aspect of the invention so that the core portion will not be deformed unduly under the temperature of the heat-treatment for causing the above mentioned mutual diffusion of ions.

In the first aspect of the invention, it is preferable that the viscosity of the glass of coating layer is $10^5$ times as small as that of the core glass. This is for the reason that if the viscosity of the glass of coating layer is more than said $10^5$ times, so much higher treating temperature must be maintained (at a degree that the diffusion of ion in the glass of coating layer is occurred). In that case, the viscosity of the core glass becomes too low and therefore there is the possibility that the core glass is unfavourably fluidized in said glass.

Furthermore, the above mentioned difference between the viscosities is particularly necessary when a glass bar is softened by heating and stretched or spun into a fiber with simultaneous mutual diffusion of the ions in order that a suitable spinning speed is maintained, and, moreover, the glass fiber is kept under a sufficiently high temperature for accelerating the thermal diffusion of the at least two kinds of ions.

In the first aspect of the invention, the speed of the mutual thermal diffusion of ions is determined mainly by the speed of diffusion of ions in the coated layer which has a higher viscosity at a high temperature, and for this reason, the higher temperature must be so selected that a suitable amount of ions in the coated layer may diffuse into the core portion of the glass fiber.

The treating temperature is preferably higher than the temperature at which the viscosity of coating layer becomes $10^{12}$ poise, and lower than the temperature at which the viscosity of coating layer becomes $10^5$ poise. If the treating temperature is lower than the temperature of said $10^{12}$ poise, the speed of the mutual diffusion of ions decreases, and a long time is required for the treatment, therefore it is not preferable. Furthermore, if the treating temperature is higher than the temperature of said $10^5$ poise, the glass fiber is easily deformed on the treatment, therefore it is not preferable.

When the glass fiber is treated while in a still condition thereof, it is more preferable that the treating temperature is higher than the temperature at which the viscosity of coating layer becomes to $10^{12}$ poise, and lower than the temperature at which the viscosity of coating layer becomes to $10^9$ poise. When the glass fiber is treated under the stretching condition thereof, it is more preferable that said treating temperature is higher than the temperature at which the viscosity of coating layer becomes to $10^8$ poise, and lower than the temperature at which the viscosity of coating layer becomes to $10^5$ poise.

In the second aspect of the invention, on the other hand, the heat treating temperature is so selected that the mutual diffusion of the ions contributing greatly to the refractive index included in the core portion and the ions contributing less to the same included in the coating layer is attained through the boundary layer between the core portion and the coated layer.

While the third material employed in the second aspect of the invention may be a metal, metal oxide, glass, or graphite, in the particular case where the glass bar is stretched and spun into a glass fiber under a high temperature, and simultaneously a desired distribution of the refractive index is obtained, a suitable third material is a glass, preferably a glass having an expansion coefficient nearly equal to that of the glass fiber.

Furthermore, for the purpose of preventing deterioration of light-transmitting characteristic of the glass fiber due to internal strain, the glass employed for the core portion and that for the coated layer in the first and the second aspects of the invention are so selected that the thermal expansion coefficients of the two kinds of glasses are nearly equal. That is, the difference of the thermal linear expansion coefficients of these glasses is selectively made less than $50 \times 10^{-7}$, preferably less than $20 \times 10^{-7}$ per 1° C.

Referring now to FIG. 1 showing an example of a heat-treating furnace employed in the production process according to the present invention and also showing the manner in which a glass tube and a glass bar are melted together and stretched, there are indicated a glass tube 1 having a comparatively high viscosity and a glass bar or rod 2 having a comparatively low viscosity at a heat-treating temperature and formed into the core portion of the glass fiber after it is stretched. The furnace includes a heat insulating material 3 and a heat generating body 4. The glass tube 1 and the glass bar 2 are fed into the heat-treating furnace at a constant speed and drawn out of the furnace at a far faster speed than the feeding speed. For a satisfactory fusion between the glass tube 1 and the glass bar 2, it is desirable that the gap between the two members be thoroughly evacuated.

The glass bar on rod 2 before being subjected to the stretching process comprises two kinds of glasses, with respect to their composition, and being disposed concentrically. As considered from the boundary surface shown by the broken line, the inner or core portion is a glass containing Tl ions and the outer or sheath portion is another kind of glass containing at least one kind of ions selected from Li, Na, K, Rb, and Cs.

It is well known that the diffusion of ions through the boundary surface of the two kinds of glasses is faster when the ions are monovalent cations. As a result, if it is desired to have a distribution of refractive index adapted for light conduction, at least two kinds of cations having a large difference in their electronic polarization coefficients per unit volume, for instance, Tl ions and at least one kind of ions selected from Li, Na, K, Rb, and Cs are preferably employed for mutual diffusion.

FIGS. 2(a), 2(b), and 2(c) indicate variation of the refractive index distribution according to time on both sides of the boundary surface of a glass bar 2 over which a glass tube 1 of a high-viscosity glass is applied and stretched at a higher temperature so that the mutual diffusion of cations is accelerated. More specifically, FIG. 2(a) indicates a refractive index distribution in a glass bar fused with the glass tube but not yet stretched. FIG. 2(b) indicates another refractive index distribution in the glass bar at the initial stage of stretching which is measured by quenching the glass bar for freezing the distribution of the refractive index at that instant. On the other hand, FIG. 2(c) indicates the ultimate distribution of the refractive index which can exhibit a focusing, light-conducting nature after the glass bar fused with the glass tube is heated and stretched.

The distribution of the refractive index shown in FIG. 2(c) can be expressed by a parabolic equation:

$$n = n_0(1 - ar^2)$$

wherein $n_0$ is the refractive index at the center of the glass fiber, $r$ denotes radial distance measured from the center, and $a$ is a positive constant. The glass fiber having a refractive index distribution of this character is highly useful as a transmission path for the light-communication technique and also as a novel lens-like body employed for optical and information-processing techniques.

In order to determine the required heat-stretching conditions for obtaining a glass fiber having a parabolic distribution of refractive index by the method according to the present invention, the viscosities of a silicate-series glass containing the above described ions and the diffusion coefficients of the Tl ions were investigated through a series of experiments. The test results are indicated in Table 1.

TABLE 1

| Temperature | Viscosity of glass at the central portion, poise | Diffusion coefficient Tl ions, cm.²/sec. |
| --- | --- | --- |
| 600° C | $10^{7.2}$ | $2 \times 10^{-8}$ |
| 700° C | $10^{5.9}$ | $1 \times 10^{-7}$ |
| 800° C | $10^{5.0}$ | $5 \times 10^{-7}$ |
| 900° C | $10^{4.2}$ | $2 \times 10^{-6}$ |

The composition (mole percent) of the glass portions and the refractive indices thereof employed in the experiments before the glass portions were heat-stretched for causing the mutual diffusion are indicated in Table 2.

In this example, the viscosity of the glass at the peripheral portion is substantially equal to that of the glass at the central portion.

TABLE 2

| | $SiO_2$ | $Na_2O$ | $K_2O$ | $Tl_2O$ | PbO | Refractive index |
| --- | --- | --- | --- | --- | --- | --- |
| Central portion | 70.3 | 17.0 | | 3.3 | 9.4 | 1.60 |
| Peripheral portion | 70.5 | 17.0 | 3.5 | | 9.0 | 1.56 |

On the other hand, when the temperature and processing optimum period required for producing a light-conducting glass fiber having a focusing characteristic and a parabolic refractive index distribution determined on the basis of the diffusion coefficients indicated in Table 1, the values as shown in the following Table 3 are obtained.

TABLE 3

| | Processing period | |
| --- | --- | --- |
| | For glass fiber having 0.4 mm. outer diameter and 0.2 mm. central portion diameter. | For glass fiber having 1.0 mm. outer diameter and 0.5 mm. central portion diameter. |
| Treating temperature: | | |
| 600° C | 13 minutes | 1 hour 30 minutes. |
| 700° C | 1 minute 20 seconds | 17 minutes. |
| 800° C | 16 seconds | 3 minutes 20 seconds. |
| 900° C | 4 seconds | 50 seconds. |

Although it is difficult to heat-stretch a glass bar having the indicated composition during a comparatively long period as indicated in Table 3, for instance, to obtain the light-conducting glass fiber having focusing characteristic and having 0.4 mm. outer diameter and 0.2 mm. central portion diameter by heat-stretching the glass bar having said components at 700° C. for 1 minute and 20 seconds, this difficulty can be solved by the employment of a glass tube of relatively high viscosity for coating the glass bar, so that the apparent viscosity of the thus combined glass bar is elevated.

The viscosities of the glass tube suitable for the glass bar of a composition shown in Table 2 at temperatures of 600°, 700°, 800°, and 900° C. are $10^{9.0}$, $10^{7.7}$, $10^{6.8}$, and $10^{5.9}$ poises, respectively. An example of the composition, in weight percent, of the glass tube is 68.8% of $SiO_2$, 17.1% of $Na_2O$, 6.9% of $K_2O$, 1.7% of $Al_2O_3$, 2.0% of MgO, and 3.5% of CaO.

Furthermore, it is required that the expansion coefficients of different glass portions be sufficiently near to each other. The coefficients of linear expansion for the glass at the central portion in the example shown in Table 2 was $124 \times 10^{-7}$, and that for the peripheral glass portion thereof was $128 \times 10^{-7}$. Furthermore, the expansion coefficient of the glass tube was $122 \times 10^{-7}$.

We have found that in the case where the above described glass bar is stretched without being coated by the outer layer of the glass tube having a higher viscosity, for instance, a glass bar having an outer diameter of 16 mm. and a central portion diameter of 8 mm., is stretched into a glass fiber of 1.0 mm. outer diameter, stable spinning can be carried out if the bar is stretched at a speed of from 150 to 350 cm./min. at a temperature in the range of from 650° to 750° C., and when the same glass bar is stretched into a glass fiber of 0.4 mm. outer diameter, a stretching speed of from 300 to 1,300 cm./min. is suitable for the same temperature range.

However, it is also apparent that the glass fiber thus being stretched at any of the above mentioned speeds cannot be maintained in a furnace for a period indicated in the Table 3, and for this reason, the glass fiber thus obtained cannot have a sufficient light-conducting characteristic.

On the other hand, when the above described glass bar is sheathed with a glass tube of a higher viscosity and of an inner diameter of 16 mm. and an outer diameter of 20 mm., the apparent viscosity of the composite glass bar is elevated, and the glass bar can be stretched at the same speed even if the ambient temperature at the time of stretching is raised to a higher temperature range of from 750° to 850° C.

The obtained glass fiber has outer diameter of 0.53 mm., outer peripheral glass portion diameter of 0.4 mm., central glass portion diameter of 0.2 mm., and the refractive index of cross-sectional plane of the glass fiber at the central portion thereof, namely at the inner points of the central circle having a diameter of 15 micron, satisfied afore-mentioned formula, when $a$ is a value of 0.63 mm.$^{-2}$.

More specifically, according to the present invention, when the above-described ambient temperature is raised to 800° C., for instance, the apparent viscosity of the glass fiber overlaid with the glass tube becomes substantially equivalent to the viscosity of the glass tube equal to $10^{6.8}$ poise. This value is several tens of times greater than the viscosity of the glass fiber having no overlying glass tube, the stretching temperature of which is maintained at 800° C. and the value of the viscosity is found to be around $10^{5.0}$ poise, and the apparent value of viscosity falls between $10^{5.9}$ and $10^{7.2}$ poise corresponding to the viscosities of the glass fiber having no overlying tube at the temperatures of 600° C. and 700° C., respectively.

Accordingly, the glass fiber having an overlying tube of a higher viscosity can be stretched at a temperature which is more than 100° C. higher than that for glass fiber having no overlying tube when the stretching speeds for the fibers are made equal, and the thermal diffusion of ions in the former case can be accelerated as a result of the higher temperature.

As a result, according to the present invention, a glass fiber having a refractive-index distribution sufficient for producing the light-conducting characteristic can be obtained simultaneous with the stretching procedure of the glass fiber. That is, the glass fiber can be maintained in the furnace for a sufficient period for diffusion as indicated in Table 3, whereby the glass fiber can be produced continuously. Furthermore, according to the present invention the step required for obtaining a required distribution of the refractive index can be unified together with the step required for stretching the glass bar into a glass fiber, whereby not only is the treating period of the fiber shortened, but the production apparatus can also be simplified.

The following examples of this invention will indicate still more fully the nature and utility thereof.

Example 1

In this example of the first aspect of the invention, a glass bar comprising beforehand a core portion of glass of a composition, expressed in mole percent, of 70.3% $SiO_2$, 17.0% $Na_2O$, 3.3% $Tl_2O$, and 9.4% $PbO$, and a refractive index which is 1.60 and an outer layer of a glass the composition of which is, in weight percent, 68.8% $SiO_2$, 17.1% $Na_2O$, 6.9% $K_2O$, 1.7% $Al_2O_3$, 2.0% $MgO$, and 3.5% $CaO$ was employed. The outer diameter of the glass bar was 5 mm., in which the outer diameter of the core portion was 2 mm. The two portions of glass were coaxially disposed and fused together.

This glass bar was then sent into a furnace maintained at a temperature of 800° C. at a constant speed. The glass bar was thus heated to 800° C. and stretched into a glass fiber having an outer diameter of 600 microns and central portion diameter of 240 microns. The viscosity of the core glass at 800° C. was about $10^{5.0}$ poise, and the viscosity of the outer coated layer was about $10^{6.8}$ poise. Accordingly, the outer layer had a viscosity of a value more than 10 times greater than that of the core glass. During the heat stretching process, thallium ions in the core glass and Na and K ions in the outer layer glass were mutually diffused in the opposing portions through a boundary surface of the two portions, and as a result, the distribution of the refractive index within the glass fiber in a transverse plane relative to the longitudinal axis of the glass fiber was a parabolic distribution with a refractive index decreasing from the central portion toward the periphery in proportion to the second power of distance measured from the center of the glass bar.

The refractive index of the cross-sectional plane of glass fiber at the central portion thereof, namely, at the inner points of the central circle having a diameter of 25 microns, satisfied afore-mentioned formula, when $a$ is a value of 0.44 mm.$^{-2}$.

Example 2

In this example also of the first aspect of the invention, a glass fiber comprising a core glass of composition, expressed in mole percent, of 70.3% $SiO_2$, 17.0% $Na_2O$, 3.3% $Tl_2$ and 9.4% $PbO$, of a refractive index of 1.60 and an outer coating layer of glass of a composition, expressed in weight percent, of 68.8% $SiO_2$, 17.1% $Na_2O$, 6.9% $K_2O$, 1.7% $Al_2O_3$, 2.0% $MgO$, and 3.5% $CaO$ was employed.

The outer diameter of this glass fiber was reduced to 0.4 mm., wherein the diameter of the core glass was 0.2 mm. This glass fiber had a length of about 50 cm. and the core glass and the outer layer was completely fused together. The glass fiber was hung with a heating furnace and maintained therein for about 3 hours at a temperature of 500° C. During this heat treatment, thallim ions in the core glass and Na and K ions in the outer layer were mutually diffused into opposite portions, and the distribution of the refractive index in a transverse plane which was reduced from a value at the center in proportion to the second power of distance could be obtained.

When this distribution is simulated by the equation indicated before, the constant $a$ in the equation was found to be 0.63 mm.$^{-2}$.

In the above described example, the measurements of the glass fiber after the heat treatment coincided with those before the treatment, whereby the fact that the glass fiber was not deformed by the heat-treatment was thereby verified. It was also found that in the treatment the viscosity of the core glass at a temperature of 500° C. was $10^{8.6}$ poise, and the viscosity of the outer layer glass was $10^{10.4}$ poise.

When the core glass was coated with a glass of another composition comprising, in mole percent, of 70.5% $SiO_2$, 17.0% $Na_2O$, 3.5% $K_2O$, and 9.0% $PbO$, instead of the preceding composition, and a glass fiber of the same measurements as described above was heat-treated under the same condition as described above, it was found that the diameter of the glass fiber was varied along its length, the maximum difference of the diameters being of the order of 0.1 mm. For the purpose of eliminating this deformation of the glass fiber, a heat-treatment was carried out at a reduced temperature of 460° C. In this case, although the deformation itself could be prevented, the duration of the treatment was elongated to about 36 hours.

Example 3

According to the second aspect of the invention, a glass fiber comprising a core glass composed, in mole percent, of 70.3% $SiO_2$, 17.0% $Na_2O$, 3.3% $Tl_2O$, and 9.4% $PbO$, and having a refractive index of 1.60; an outer coating layer composed, in mole percent, of 70.5% $SiO_2$, 17.0% $Na_2O$, 3.5% $K_2O$, and 9.0% $PbO$, and having a refractive index of 1.56; and a third coating layer consisting of a glass, the composition thereof, expressed in weight percent, being 68.8% $SiO_2$, 17.1% $Na_2O$, 6.9% $K_2O$, 1.7% $Al_2O_3$, 2.0% $MgO$, and 3.5% $CaO$, was prepared.

The outer diameter of the glass fiber was 0.7 mm., the outer diameter of the second layer was 0.4 mm., and the outer diameter of the core glass was 0.2 mm. The length of the glass fiber was approximately 50 cm.

The above described three components of the glass fiber were fused concentrically together. When the above described glass fiber was heat-treated under the same conditions (at 500° C. and for 3 hours) as in Example 2, a glass fiber having substantially the same refractive index distribution and not having any deformation could be obtained. At the heat-treatment temperature of 500° C., the viscosities of the core glass, second layer, and of the third layer were $10^{8.6}$ poise, $10^{9.2}$ poise, and $10^{10.4}$ poise, respectively.

What is claimed:

1. A process for producing a light-conducting glass fiber having a core portion and an outer coating layer disposed peripherally around said core portion and wherein the refractive index in the core portion in any cross-section perpendicular to the center axis of the glass fiber is so distributed that it continuously decreases outward from a certain value at the center axis, which comprises: preparing a glass fiber consisting of a core glass containing therein in an initially constant and uniform concentration thallium ions having a high degree of contribution to the refractive index and having an initially constant and uniform refractive index, and an outer layer glass peripherally surrounding said core glass and containing therein in an initially constant and uniform concentration at least one kind of second ions having a lesser degree of contribution to the refractive index selected from the group consisting of Li, Na, K, Rb, and Cs ions and having an initially constant and uniform refractive index and having a higher viscosity than that of said core glass at the subsequent treating temperature; and heating said glass fiber to a high treating temperature higher than the temperature at which the viscosity of the outer layer glass becomes $10^{12}$ poise and lower than the temperature at which the viscosity of the outer layer glass becomes $10^5$ poise and to a temperature high enough to make the viscosity of the outer layer glass 4 to $10^5$ times as great as the viscosity of the core glass and to a temperature high enough to cause undesirable deformation of said core glass due to the softening thereof unless it is clad by said outer layer glass for a period of time long enough to diffuse said thallium ions in the core glass into the outer layer glass and to diffuse said second ions in said outer layer glass into said core glass to provide a lower concentration of said thallium ions at the portion nearer to the boundary surface in the core glass in comparison with said initially constant and uniform concentration of the core glass and to provide the gradients of concentrations of said thallium and said second ions, respectively, in the core glass gradually decreasing and increasing outward from the center of the core glass to thereby obtain said refractive index distribution in the core glass due to said gradients of concentration of the thallium ions and the second ions and accelerate the diffusion of said ions while preventing undesirable deformation of the glass fiber due to the softening thereof by the high temperature.

2. A process as set forth in claim 1 wherein said heating step comprises vertically introducing said glass fiber at a constant speed into a heating zone maintained at a temperature higher than the temperature at which the viscosity of the coating glass becomes $10^8$ poise and lower than the temperature at which the viscosity of the coating glass becomes $10^5$ poise, and withdrawing the glass fiber from said heating zone at a greater speed than said constant speed to stretch the same into a fiber having a smaller diameter than that of said glass fiber.

3. A process as set forth in claim 1 wherein each of said core glass and outer layer glass contains $SiO_2$.

4. A process for producing a light-conducting glass fiber having a core portion, a first coating layer disposed peripherally around said core portion, and a second coating layer disposed peripherally around said first outer coating layer and wherein the refractive index in the core portion in any cross-section perpendicular to the center axis of the glass fiber is so distributed that it continuously decreases outward from a certain value at the center axis, which comprises: preparing a glass fiber consisting of a core glass containing therein in an initially constant and uniform concentration thallium ions having a high degree of contribution to the refractive index and having an initially constant and uniform refractive index, a first coating layer glass peripherally surrounding said core glass and containing therein in an initially constant and uniform concentration at least one kind of second ions having a lesser degree of contribution to the refractive index selected from the group consisting of Li, Na, K, Rb, and Cs ions and having an initially constant and uniform refractive index and having a higher viscosity than that of said core glass at the subsequent treating temperature; and a second coating layer glass disposed peripherally around said first coating layer glass and having a viscosity higher than that of said first coating layer glass at the subsequent treating temperature and wherein said core glass, said first coating layer glass and second coating layer glass are mutually fused together; and heating said glass fiber to a high temperature at which said second coating layer glass does not undesirably deform due to the softening thereof yet which is high enough to make the viscosity of said second layer glass 4 to $10^5$ times as great as the viscosities of said core and first coating layer glasses and high enough to make the core glass and the first coating layer glass undesirably deform due to the softening thereof unless they are clad by said second coating layer glass for a period of time long enough to diffuse said thallium ions in the core glass and said second ions in the first coating layer glass toward said first covering layer glass and said core glass respectively through a boundary surface therebetween to provide a lower concentration of said thallium ions at the portion nearer to the boundary surface in the core glass in comparison with said initially constant and uniform concentration of the core glass and to provide the gradients of concentration of said thallium and said second ions, respectively, in the core glass gradually decreasing and increasing outward from the center of the core glass to thereby obtain said refractive index distribution in the core glass due to said gradients of concentration of the thallium ions and the second ions and accelerate the diffusion of said ions while preventing undesirable deformation of the glass fiber due to the softening thereof by the high temperature.

5. A process as set forth in claim 4; wherein said heating step comprises vertically introducing said glass fiber at a constant speed into a heating zone maintained at said higher temperature, and withdrawing the glass fiber from said heating zone at a greater speed than said constant speed to stretch the same into a fiber having a smaller diameter than that of said glass fiber.

6. A process as set forth in claim 5; wherein each of said core glass and first coating layer glass contains $SiO_2$.

7. A process for producing a light-conducting glass fiber composed of a core glass having a refractive index distribution throughout its length in a plane perpendicular to the fiber optical axis progressively decreasing from the optical axis to the periphery of said core glass and a sheath glass peripherally surrounding said core glass comprising: providing a glass rod composed of a core glass having a given uniform refractive index and having uniformly dispersed therein Tl ions which contribute to a greater degree to the refractive index of glass and a sheath glass peripherally surrounding said core glass and having a uniform refractive index lower than said given refractive index and having uniformly dispersed therein second ions selected from the group consisting of Li, Na, K, Rb and Cs ions which contribute to a lesser degree to the refractive index of glass and having a higher viscosity than that of said core glass at the subsequent treating temperature; heat-treating said glass rod at a treating temperature high enough to sufficiently soften said core glass to a degree that same would readily deform in the absence of said sheath glass and for a time duration long enough to effect diffusion of Tl ions through the boundary existing between said core and sheath glasses into said sheath glass coincidently with diffusion of second ions through said boundary into said core glass to impart to said core glass throughout its length a refractive index distribution in a plane perpendicular to a longitudinal axis thereof progressively decreasing from said longitudinal axis to the periphery of said core glass due to both a progressively decreasing concentration of Tl ions from said longitudinal axis to the core glass periphery and a progressively decreasing concentration of second ions from said core glass periphery to said longitudinal axis; and stretching said glass rod during said heat-treating into a glass fiber composed of a core glass having a refractive index distribution throughout its length in a plane perpendicular to said longitudinal axis progressively decreasing from said longitudinal axis to the periphery of said core glass and a sheath glass peripherally surrounding said core glass.

8. A process according to claim 7; wherein the heat-treating temperature is effective to impart a viscosity of from $10^5$ to $10^{12}$ poise to said sheath glass during said heat-treating.

9. A process according to claim 7; including providing a coating layer of glass having a viscosity higher than that of said sheath glass at said treating temperature peripherally around said sheath glass prior to said heat-treating to prevent undesirable deformation of both said core and sheath glasses due to their softening during said heat-treating.

References Cited

UNITED STATES PATENTS

| | | | |
|---|---|---|---|
| 3,589,793 | 6/1971 | Curtiss | 65—DIG. 7 |
| 2,992,517 | 7/1961 | Hicks, Jr. | 65—4 X |
| 3,146,082 | 8/1964 | Hicks, Jr. et al. | 65—61 X |
| 3,428,475 | 2/1969 | Teeg | 65—DIG. 7 |
| 3,614,197 | 10/1971 | Nishizawa | 65—4 |
| 3,083,123 | 3/1963 | Havias | 65—DIG. 7 |
| 3,320,114 | 5/1967 | Schulz | 65—30 X |
| 3,486,808 | 12/1969 | Hamblen | 65—30 X |
| 3,582,297 | 6/1971 | Lakeman | 65—4 |
| 3,625,686 | 12/1971 | Kitana | 65—DIG. 7 |
| 3,607,322 | 9/1971 | Brady et al. | 65—DIG. 7 |
| 3,395,994 | 8/1968 | Cuff | 65—30 |

FRANK W. MIGA, Primary Examiner

U.S. Cl. X.R.

65—4, 30, DIG 7, 121, 117; 350—96, 178; 161—175